(12) United States Patent
Emerling

(10) Patent No.: US 6,409,210 B1
(45) Date of Patent: Jun. 25, 2002

(54) INTEGRATED SIDE AIR CURTAIN AND INFLATOR OVERHEAD SYSTEM

(75) Inventor: David Emerling, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/616,850

(22) Filed: Jul. 14, 2000

(51) Int. Cl.$^7$ ................................................ B60R 21/22
(52) U.S. Cl. ................................. 280/730.2; 296/214
(58) Field of Search ......................... 280/730.1, 730.2; 296/214

(56) References Cited

U.S. PATENT DOCUMENTS

| | | | |
|---|---|---|---|
| 5,265,903 A | | 11/1993 | Kuretake et al. |
| 5,333,899 A | | 8/1994 | Witte |
| 5,362,097 A | | 11/1994 | Barske |
| 5,470,103 A | | 11/1995 | Vaillancourt et al. |
| 5,588,672 A | | 12/1996 | Karlow et al. |
| 5,602,734 A | * | 2/1997 | Kithil |
| 5,775,726 A | * | 7/1998 | Timothy et al. |
| 5,865,462 A | | 2/1999 | Robins et al. |
| 5,884,937 A | | 3/1999 | Yamada |
| 5,899,491 A | | 5/1999 | Tschaeschke |
| 5,924,723 A | | 7/1999 | Brantman et al. |
| 5,938,233 A | | 8/1999 | Specht |
| 6,070,902 A | * | 6/2000 | Kowalski et al. |
| 6,073,961 A | * | 6/2000 | Bailey et al. |
| 6,123,355 A | * | 9/2000 | Sutherland |
| 6,227,561 B1 | * | 5/2001 | Jost et al. |

\* cited by examiner

*Primary Examiner*—Paul N. Dickson
(74) *Attorney, Agent, or Firm*—Brooks & Kushman PC

(57) ABSTRACT

An integrated headliner and passive occupant restraint system and a method of manufacturing the integrated headliner and passive occupant restraint system and headliner is provided. The system includes a headliner, an inflatable restraint air curtain and a gas generator. The headliner is mounted inside a vehicle and across the interior roof of the vehicle. The headliner may include a plurality of layers comprised of PET Batt material or the like. The headliner insulates the vehicle from outside sound and outside temperature. The inflatable restraint curtain is disposed within the plurality of headliner layers, the inflatable restraint curtain operative to cushion a vehicle occupant's head and torso during a side impact collision. Furthermore, a gas generator is in fluid communication with the inflatable restraint curtain. The gas generator generates gas in response to the signal generated by the plurality of sensors. The generated gas inflates the curtain causing the curtain to expand and tear the seam between the layers of the headliner and to cover the window of the vehicle.

10 Claims, 2 Drawing Sheets

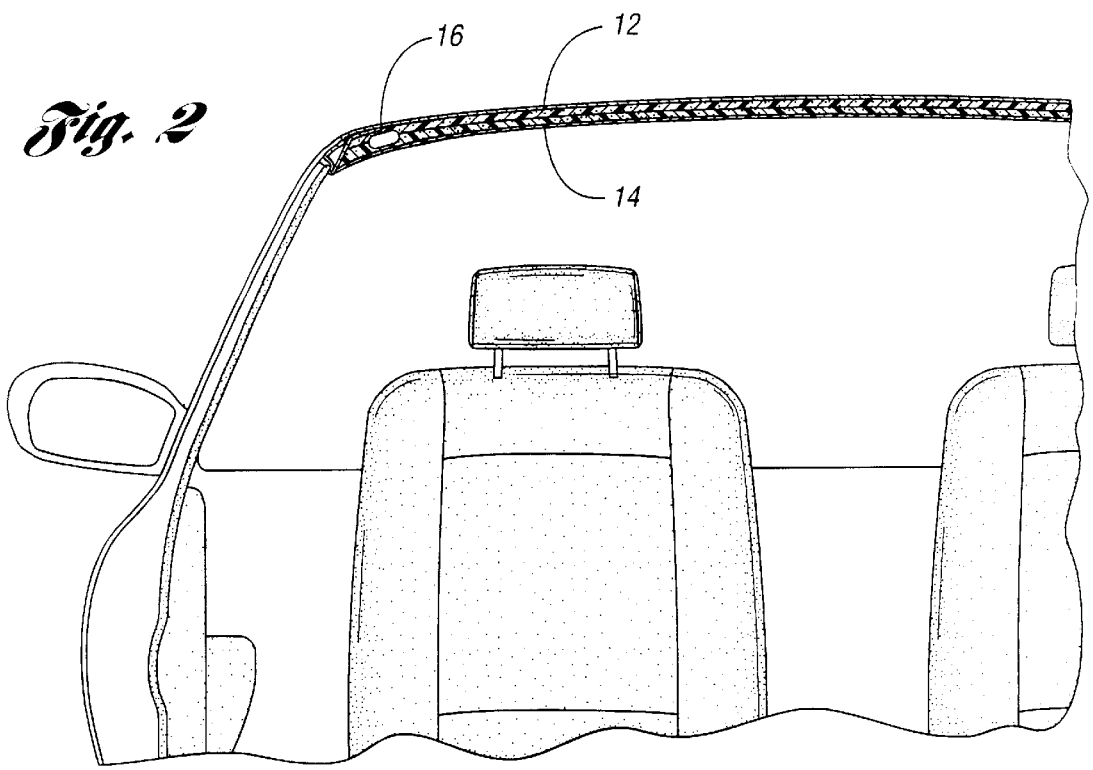
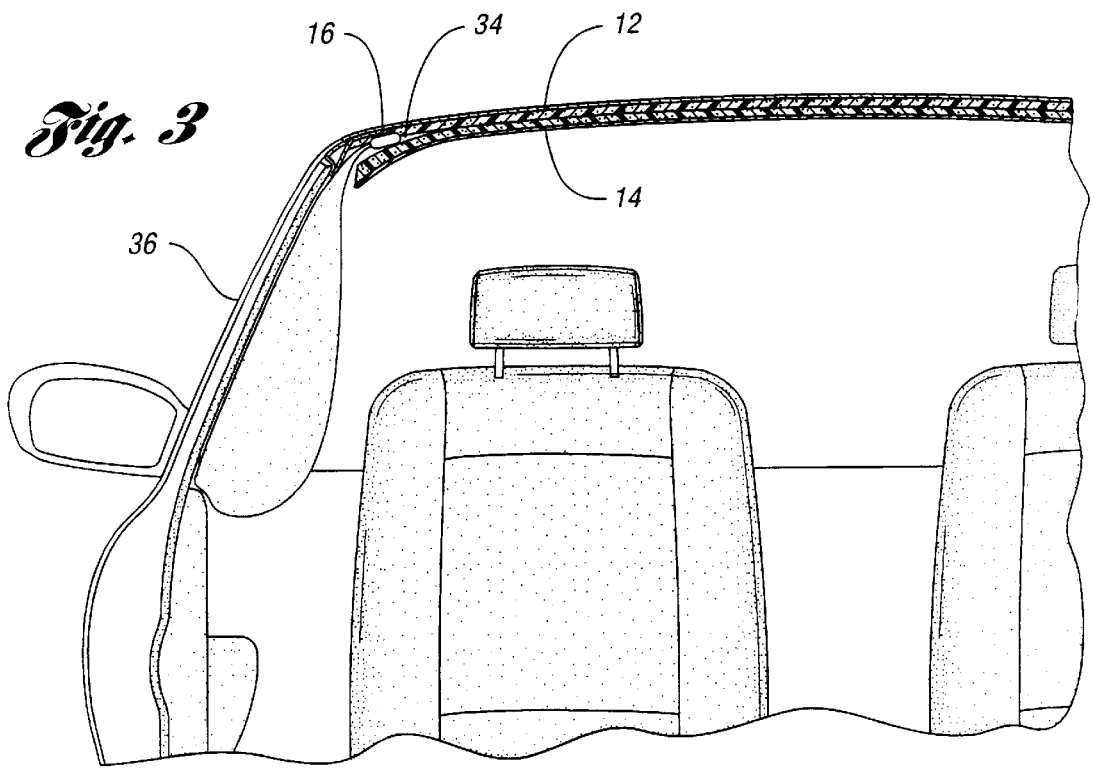

INTEGRATED SIDE AIR CURTAIN AND INFLATOR OVERHEAD SYSTEM

TECHNICAL FIELD

This invention relates to a side air curtain and inflator overhead system and to a method of manufacturing thereof.

BACKGROUND ART

Automotive manufacturers have invested significant resources toward the development of safety devices. These devices include active restraint systems such as seat belts and passive restraint systems such as air bags. Air bags are well known in the art and are frequently implemented/incorporated into vehicles. Generally, air bag systems include one or more air bags which are stored and packaged in a folded or deflated condition in storage areas within the passenger compartment of the motor vehicle. The air bag systems include sensors located at various points in the vehicle. Upon impact, the sensors are triggered thereby sending a signal to a gas generator or ignitor. The gas generator or ignitor is connected/linked to the air bag. The gas generator operates to inflate the air bag when it receives a signal from the sensors.

As the air bag is inflated, the air bag breaks through its storage compartment and then acts to cushion the vehicle occupant against impact with the interior of the motor vehicle.

It is well known in the art to mount air bags in the front dashboard of a motor vehicle on the front passenger side or in the steering wheel of a motor vehicle in order to protect a driver. Although known in the art and less commonly implemented, side mounted air bags may be employed in a motor vehicle. Side mounted air bags are generally mounted directly onto the roof of the vehicle where the side mounted air bag is a curtain which protects the occupant from colliding against the A-Pillar, B-Pillar, and/or windows of the motor vehicle. Upon impact, the side mounted air curtain air bag inflates and bends the headliner edge downward so that the air curtain may protect the occupant from the window and pillars of the motor vehicle. Although this air bag has many benefits, the space limitations in the interior of a motor vehicle have proven it difficult to incorporate this type of air bag into a motor vehicle. For example, upon impact the side air curtain must be securely anchored to the motor vehicle to insure that it is properly positioned between the occupant and the vehicle frame/windows. In an attempt to meet this objective, prior art systems generally anchored at several points along the curtain or at each end of the air curtain to the roof of the motor vehicle. U.S. Pat. No. 5,588,672 issued to Karlow et al. discloses the curtain-style air bag and a typical mounting arrangement where the air bag curtain is mounted at each end of the curtain. Karlow further mounts one end of the curtain to a moveable mounting point to guide the curtain down the vehicle as it is inflated. Other systems may include a tether between the air bag curtain and the roof to properly guide the curtain down the motor vehicle.

However, as part of the manufacturing process, a substantial amount of time and labor resources are used to mount the air bags to the motor vehicle and then assemble the components surrounding the vehicle. For example in U.S. Pat. No. 5,470,103 issued to Vaillancourt, a motor vehicle head impact air bag system is provided. The Vaillancourt reference describes an air bag which deploys downward from impacting with the upper interior portions of the vehicle. The air bag is hidden in the ceiling of the vehicle behind panels in a vinyl cover. The panels open by the inflation of the air bag to allow its downward deployment. The panels are defined by a tear seam and a living hinge formed in the vinyl cover.

With respect to the side curtain air bag, this type of air bag, as mentioned before, is generally mounted directly to the roof of the motor vehicle. Then, the next manufacturing step requires the attachment of the headliner to the motor vehicle. These separate manufacturing steps require automobile assemblers to invest more time, packaging costs, and labor costs than is necessary to produce a vehicle.

Consequently, a need has developed for a side impact head restraint system which is integrated with a headliner of an automobile thereby reducing manufacture time and manufacture errors while ensuring an effective and reliable safety restraint system.

DISCLOSURE OF INVENTION

It is a principle object of this invention to provide an integrated passive occupant restraint system and headliner which may be installed/incorporated into a motor vehicle in one step.

It is another object of this invention to reduce the time of assembling a motor vehicle and the cost of assembling a motor vehicle.

It is yet another object of the present invention to provide a side impact head restraint system which meets minimal packing space requirements.

It is still another object of the present invention to provide a method for manufacturing an air bag curtain which is integrated with a headliner.

In carrying out the above objects and other objects and features, an integrated passive occupant restraint system and headliner is provided. The integrated headliner and passive occupant restraint system which includes a headliner, an inflatable restraint curtain, and a gas generator. The headliner is generally mounted inside a vehicle and across the interior roof of the vehicle. The headliner may include a plurality of PET (Polyethylene Terephthalate) Batt layers or other material such as foam. The headliner insulates the vehicle from outside sound and outside temperature. The inflatable restraint curtain is disposed within one or more of the headliner layers. Once inflated, the inflatable restraint curtain serves to cushion a vehicle occupant's head and torso during a side impact collision. The inflatable restraint curtain extends beyond the headliner and is mounted to the vehicle at least two points. The first mounting point is located at a first end of the curtain and the second mounting point is located at the second end of the curtain. The inflatable air curtain is triggered by one or more sensors which are located at different points in the vehicle. The sensors detect a collision to generate a corresponding signal.

More particularly, the headliner may be comprised of one or more PET Batt layers where the side air curtain is embedded between the PET Batt layers and the layers are joined through compression molding.

Still more particularly, the sensors and the inflatable air curtain cooperate with a gas generator which is in fluid communication with the inflatable restraint curtain. The gas generator generates gas in response to a signal generated by the plurality of sensors, the generated gas inflates the curtain causing the curtain to deploy thereby tearing the seam between the headliner layers and eventually covering the window of the vehicle.

A method of manufacturing an integrated vehicle headliner and air curtain is also provided. The method includes:

providing a plurality of layers of headliner material; positioning an inflatable air curtain between said plurality of layers; and compression molding the plurality of layers to form a headliner assembly with the air curtain compressed between said layers.

As those skilled in the art will recognize, the specific embodiment of this invention can vary depending upon the specific requirements of the air curtain assembly and the headliner. Although the particular size, shape and form of the air bag curtain and headliner will vary, all embodiments utilize the elements of this invention.

The above objects, and other objects, features and advantages of the present invention are more readily understood from a review of the attached drawings and the accompanying specification and claims.

BRIEF DESCRIPTION OF DRAWINGS

FIG. 2 is a cross-sectional view of the folded air bag curtain embedded in the headliner; and FIG. 3 is a front view of the driver side of the vehicle in FIG. 1 with the air bag deployed.

BEST MODE FOR CARRYING OUT THE INVENTION

Figure 1:
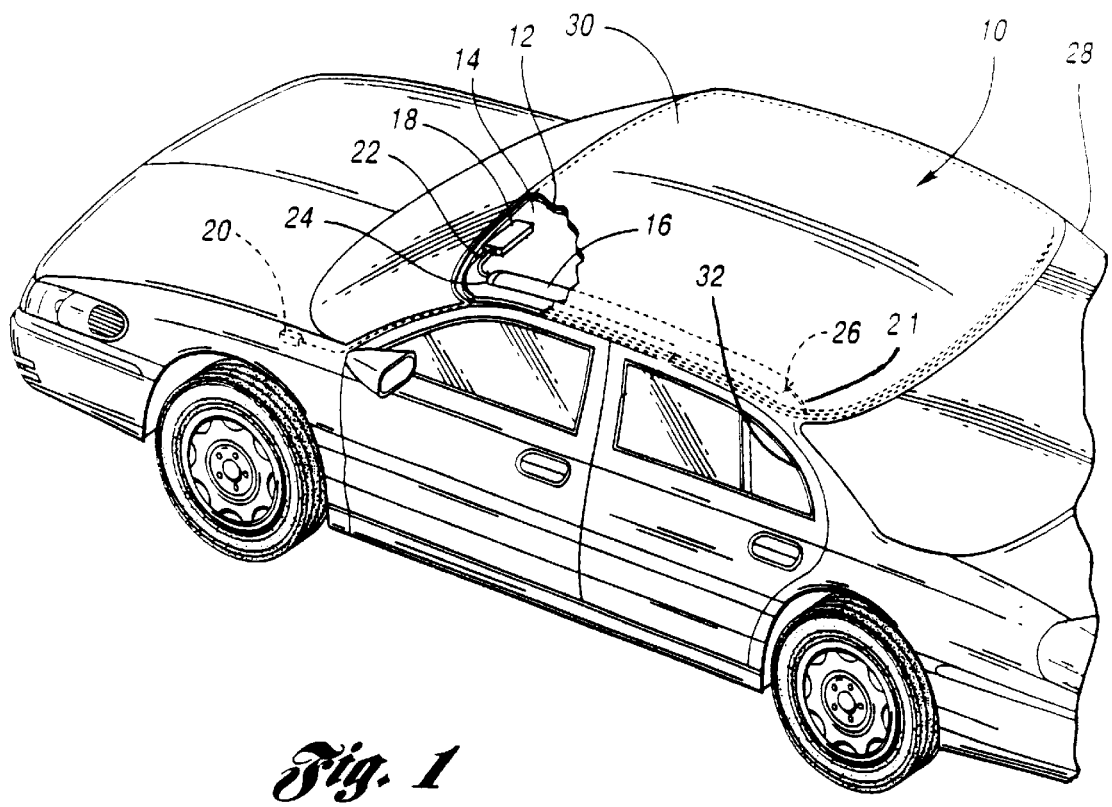
FIG. 1 illustrates a perspective view of the integrated headliner and air bag curtain installed in a motor vehicle.

With reference to FIG. 1 of the drawings, the integrated passive occupant restraint system 10 is illustrated as installed in a motor vehicle 28. As shown, the headliner 12 may include several layers 14 of material. The layers of material may be comprised of PET Batt materials or other material such as foam or cardboard. The inflatable air curtain 16 may positioned between the several layers of material. The present invention may further includes a gas generator 18 which is in communication with one or more sensors 20. The sensors 20 may come in a variety of forms but all forms of the sensors 20 serve the purpose of detecting a collision and transmitting a signal to the gas generator 28 such that the gas generator 18 inflates the side air curtain 16. The gas generator 18 may be connected to the inflatable side air curtain 16 through a hose.

The air bag curtain 16 includes a first end 24 and a second end 26 which extend beyond the headliner 12. The inflatable side curtain 16 may be mounted to the vehicle 28 through its connection to the gas generator 18 at its first end 24 and a tether 21 at its second end 26. The gas generator 18 may be directly mounted to the interior roof 30 of the vehicle 28. The gas generator 18 may be further connected to the inflatable side air curtain 16 through a hose 22. The inflatable side curtain 16 may also be connected at its second end 26 through a tether21. In an alternative arrangement, the present invention may include tethers 21 which directly fasten the air curtain 16 onto the interior roof 30, A-Pillar, and/or the C-Pillar 32 of the vehicle 28. In attaching the air curtain 16 to the interior roof 30, the air curtain may be attached through grab handles, coat hooks, or visor mounts.

As the air curtain 16 expands and moves down the interior of the vehicle 28, the tether 21 prevents the air curtain 16 from moving toward the roof 30 or toward the interior of the vehicle. As those skilled in the art will recognize, the mounting points to the air curtain 16 may be positioned in a variety of places.

With reference to FIG. 2 of the drawings, a cross sectional view of the vehicle headliner and air curtain assembly 10 is shown. The inflatable side air curtain 16 is shown in its storage mode where it is folded or collapsed between the layers 14 of the headliner 12. In another embodiment (not shown), the inflatable side air curtain may be embedded in a single layer of the headliner. The integrated side air curtain and inflator overhead system operates to cushion the vehicle occupant against impacting the interior of the vehicle by inflating the air curtain 16 upon collision. Upon collision, the sensors (not shown in FIG. 2) detect the collision and transmit a signal to the gas generator (not shown in FIG. 2). In turn, the gas generator 18 inflates the air curtain 16. The air curtain 16 expands and breaks the seam between the layers 14 of the headliner 12. The air curtain 16, as it expands, moves down the interior of the vehicle to protect the vehicle occupant from impacting the interior of the vehicle.

The integrated system in its deployed condition is further illustrated in FIG. 3. As shown, the headliner 12 is torn along the seam of the layers 14 where the air curtain 16 rested as the air curtain 16 expanded. The air curtain 16 extends down the vehicle so that it may be positioned between the vehicle occupant and the side portion of the vehicle's interior.

Figure 4:
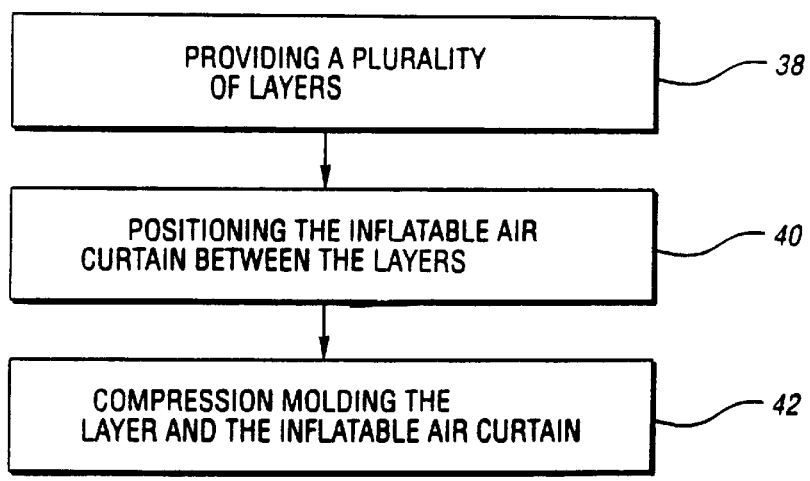
FIG. 4 is a flow chart which illustrates the method of manufacturing the integrated headliner and airbag curtain.

Referring now to FIG. 4, the method of manufacturing the integrated side air curtain and inflator overhead system is illustrated in a flow chart format. First, a plurality of layers of headliner material is provided 38. The headliner material is preferably but not necessarily comprised of PET Batt material. In the alternative, the headliner material may be comprised of foam, cardboard or the like. Second, the inflatable air curtain may be positioned 40 between the layers of the headliner. Third, the layers of material and the inflatable air curtain are compression molded 42 to form a headliner assembly with the air curtain compressed between the layers of the headliner material.

In yet another embodiment, the headliner may be comprised of a single layer where the inflatable air curtain may be embedded within the single layer. The overhead system may be formed by positioning the inflatable air curtain in a mold and pouring the material for the headliner around the air curtain. The combined materials are then heat treated to form the integrated overhead system. Upon inflation the air curtain is capable of breaking through the headliner layer to move down the interior of the vehicle thereby preventing the occupant from impacting the interior of the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An integrated passive occupant restraint system comprising:
   a headliner mounted inside a vehicle and across the interior roof of the vehicle, the headliner including a plurality of separate layers with edges of said layers being overlaid along an outer periphery of the headliner, the headliner operative to insulate the vehicle from outside sound and outside temperature;
   an inflatable restraint curtain compression molded to a compressed position within the plurality of layers, the inflatable restraint curtain operative to cushion a vehicle occupant's head and torso during a side impact collision;
   a plurality of sensors located at different points of the vehicle, the plurality of sensors operative to detect a collision and to generate a corresponding signal; and a gas generator in fluid communication with the inflatable restraint curtain, the gas generator generating gas in response to the signal generated by the plurality of sensors, such that the generated gas inflates the curtain causing the curtain to separate said edges for deployment therebetween to cover the window of the vehicle.

2. The integrated passive occupant restraint system recited in claim 1, wherein the inflatable restraint curtain having a first end and a second end extending beyond the headliner, the inflatable restraint curtain includes at least two mounting points, the first mounting point being located at the first end and the second mounting point being located at the second end.

3. The integrated passive occupant restraint system recited in claim 1, wherein the headliner is comprised of polyethylene terephthalate Batt materials.

4. The integrated passive occupant restraint system recited in claim 1, wherein the air bag on inflation extends downward and toward the floor of the vehicle.

5. An integrated passive occupant restraint system comprising:

a headliner mounted inside a vehicle and across the interior roof of the vehicle, the headliner including a plurality of separate layers with edges of said layers being overlaid and arranged coextensively along an outer periphery of the headliner, the headliner operative to insulate the vehicle from outside sound and outside temperature;

an inflatable restraint curtain compression molded to a compressed position within the plurality of layers, the inflatable restraint curtain operative to cushion a vehicle occupant's head and torso during a side impact collision; and a gas generator in fluid communication with the inflatable restraint curtain, the gas generator generating gas to inflate the inflatable restraint curtain causing the inflatable restraint curtain to deploy between said edges to cover the window of the vehicle.

6. The integrated passive occupant restraint system recited in claim 5, wherein the inflatable restraint curtain having a first end and a second end extending beyond the headliner, the inflatable restraint curtain includes at least two mounting points, the first mounting point being located at the first end and the second mounting point being located at the second end.

7. The integrated passive occupant restraint system recited in claim 5, wherein the headliner is comprised of polyethylene terephthalate Batt materials.

8. The integrated passive occupant restraint system recited in claim 5, wherein the air bag on inflation extends downward and toward the floor of the vehicle.

9. A method of manufacturing an integrated vehicle headliner and air curtain assembly comprising:

providing a plurality of separately overlaid headliner layers arranged with terraced edges proximate a side portion of the interior of the vehicle;

positioning an inflatable air curtain between said plurality of layers; and compression molding the plurality of layers to form a headliner assembly with the air curtain tightly compressed between said layers proximate the terraced edges to minimize packaging requirements.

10. The method recited in claim 9 wherein the step of providing a plurality of headliner layers includes providing a plurality of polyethylene terephthalate Batt material layers.

* * * * *